April 17, 1962

H. A. PERKINS, JR 3,030,570

MAGNETIC AMPLIFIER CIRCUIT

Filed Aug. 22, 1958

WITNESSES

Leon J. Taga

Myron E. Click

INVENTOR

Harley A. Perkins, Jr.

BY F. E. Browder

ATTORNEY 3,030,570
Patented Apr. 17, 1962

3,030,570
MAGNETIC AMPLIFIER CIRCUIT

Harley A. Perkins, Jr., Springfield Township, Montgomery County, Pa., assignor to Westinghouse Electric Corporation, East Pittsburgh, Pa., a corporation of Pennsylvania Filed Aug. 22, 1958, Ser. No. 756,603
17 Claims. (Cl. 323—89)

This invention relates to magnetic amplifier circuits in general and in particular to single winding magnetic amplifier circuits which may be utilized for the amplification of signals and for performing logic functions.

Magnetic amplifiers have become very important in the control field, both for amplification and logic function performance. The inherent advantages of ruggedness, reliability and maintenance-free operation have made them especially applicable in machine tool fields where millions of operations of an individual module may occur within a few months time. One of the important costs entailed in the manufacture of magnetic amplifiers is the time and material required to wind the conductors or windings on the reactor or magnetic core assembly.

It is, accordingly, an object of this invention to provide an improved magnetic amplifier circuit.

It is another object of this invention to provide an improved magnetic amplifier circuit which allows gating and resetting functions for a magnetic core to be performed by a single winding.

It is still another object of this invention to provide an improved magnetic amplifier circuit utilizing only a single winding having a tap connected thereto in which no impairment of stage gain results from performing the gating and resetting functions of the magnetic core through a single winding.

Further objects of this invention will become apparent from the following description as taken in conjunction with the accompanying drawings. In said drawings, for illustrative purposes only, there is shown preferred embodiments of the invention.

In the drawings the manner in which the windings have been wound upon their associated saturable magnetic cores has been denoted by the polarity dot convention. That is, current flowing into the polarity dot end of a winding will drive the inductively associated core toward positive saturation. Current flowing out of the polarity dot end of the winding will drive the inductively associated core away from positive saturation.

Figure 1:
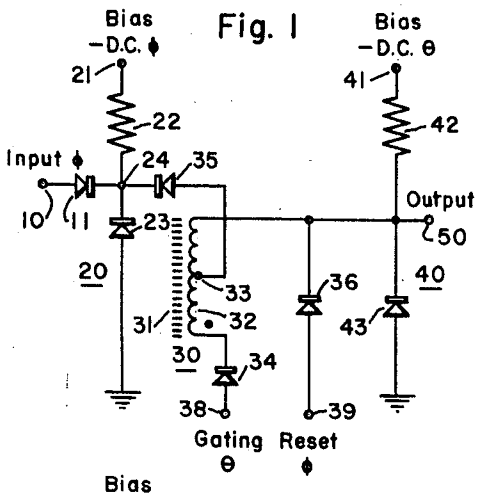
FIGURE 1 is a schematic diagram of a first embodiment of the invention.

Referring to FIGURE 1, the first embodiment of the invention comprises a magnetic amplifier 30 having an input terminal means 10, input non-linear means 20, output non-linear means 40 and output terminal means 50.

The magnetic amplifier 30 comprises a saturable magnetic core 31 having wound thereon a winding 32 which is provided with a tap 33. The gating winding 32 is connected in series with the self-saturating rectifier 34 between the terminal 38 and the terminal 50. A reset circuit path may be traced from a terminal 39 through a rectifier 36, a portion of the winding 32, the tap 33, and a rectifier 35 to the non-linear circuit 20. The non-linear circuit 20 comprises a resistor 22 and a rectifier 23 connected in series circuit relationship between ground and a terminal 21. The terminal 21 is connected to a negative, half-wave direct current of a first phase, hereinafter denoted as the $\phi$ phase. The isolation rectifier 35 is connected to the junction 24 of the resistor 22 and the rectifier 23. The input terminal 10 is connected through an isolation rectifier 11 to the junction terminal 24 of the non-linear circuit 20.

A gating circuit may be traced from the terminal 38 through the rectifier 34, all of the winding 32, to a terminal 50. The non-linear circuit 40 comprises a resistor 42 and a rectifier 43 connected between ground and a terminal 41. A source of negative, half-wave direct current of a second phase, hereinafter called the $\theta$ phase, is connected to the terminal 41. The output terminal 50 is the junction of the rectifier 43 and the resistor 42.

A source of voltage of the $\theta$ phase, which should be alternating current, is to be applied to the gating circuit at the terminal 38. A source of reset voltage of the $\phi$ phase, which may be pulsating half wave direct current or an alternating current, is to be applied to the terminal 39. The $\phi$ and the $\theta$ phases are 180° apart and of the same frequency. The magnitude of the voltages to be applied to the terminals 38 and 39 is sufficient on each half-cycle to drive the saturable core 31 to positive and negative saturation, respectively. Thus, on a first or a gating half cycle, current will flow in the winding 32 and through the non-linear circuit 40 to drive the core 31 to positive saturation. On a second or reset half-cycle, current flows through the rectifier 36, the tapped portion of the winding 32, and the rectifier 35 to the non-linear circuit 20, driving the core 31 to negative saturation. As long as there is no input signal applied at the terminal 10, the core 31 will be cycled between positive and negative saturation and no output of the $\theta$ phase, the information half-cycle, will appear at the terminal 50.

If an input of the proper magnitude and polarity is applied to the input terminal 10, it will block the resetting current, which provides the resetting action of the flux in the core 31 during the reset half-cycle, at the rectifier 35. Therefore, on the reset half-cycle, the magnetic core 31 will not be driven from positive saturation. The volt-seconds furnished by the gating voltage applied at the terminal 38, on the next half-cycle will not be consumed in driving the core 31 to positive saturation allowing an output to appear at the terminal 50 during the $\theta$ phase, or the information half-cycle.

If the apparatus of FIGURE 1 is to be used as a logic or digital circuit, the input at the terminal 10 must be of sufficient magnitude and polarity to completely block the reset current at the rectifier 35. Then on the gating half-cycle, a full output will appear at the terminal 50 for virtually the whole half-cycle. When using the apparatus as an amplifier, the input signal at terminal 10 will block only a portion of the resetting of the core 31.

The operation and function of the non-linear circuits 20 and 40 are well known in the art but will be described in brief. The bias current applied through the rectifiers of the non-linear circuits in the forward direction is of sufficient magnitude to allow, by superposition, the flow in the reverse direction through the rectifiers of exciting current as required by the core 31 during the gating and resetting half-cycles.

Figure 2:
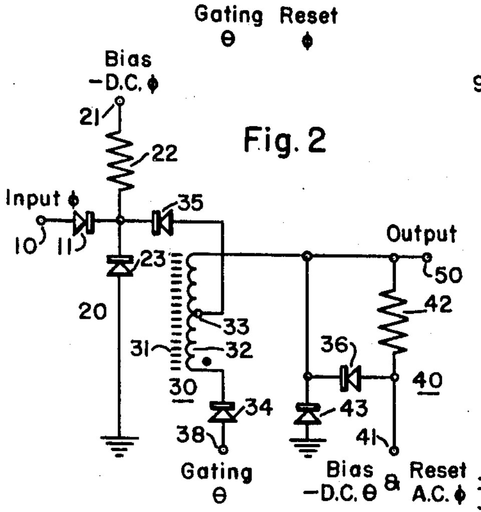
FIG. 2 is a schematic diagram of a second embodiment of the invention.

Referring to FIGURE 2, there is illustrated another embodiment of the teachings of this invention, in which like components of FIGURES 1 and 2 have been given the same reference characters. The main distinction between the apparatus illustrated in FIGURES 1 and 2 is that in FIGURE 2, the bias and reset supplies are connected to the same terminal 41. The rectifier 36 is now connected between the terminal 41 and the terminal 50. The remainder of the circuit remains the same. When the positive going reset voltage of the $\phi$ phase is applied to the terminal 41, the current flows, as before, through the rectifier 36, a portion of the winding 32, the tap 33, the rectifier 35, and the non-linear circuit 20. The polarity of the rectifier 43 prevents any application of the reset voltage to the non-linear circuit 40. On the gating half-cycle, when the negative going bias supply voltage of the $\theta$ phase is applied to the terminal 41, current flows from ground through the rectifier 43 and the resistor 42 to the terminal 41 thus allowing exciting current from the gating supply at the terminal 38 to flow through the rectifier 43 in the reverse direction.

Since the remainder of the operation is essentially the same as hereinbefore described with the apparatus in FIG. 1, further description of the apparatus of FIG. 2 is deemed unnecessary.

Figure 3:
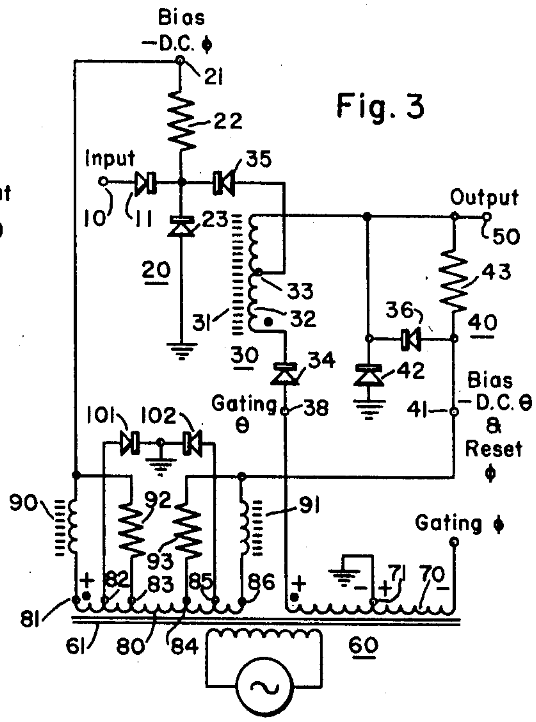
FIG. 3 is a schematic diagram of a third embodiment of the invention.

Referring to FIG. 3, there is illustrated a third embodiment of the teachings of this invention in which like components of FIGS. 2 and 3 have been given the same reference characters. The main distinction between the apparatus illustrated in FIGS. 2 and 3 is that in FIG. 3, a power supply 60 has been provided for the amplifier that was illustrated in FIG. 2. The power supply 60 comprises a transformer 61 having inductively disposed thereon a primary winding 62, a secondary winding 70 and a secondary winding 80. A source of alternating-current voltage of a suitable magnitude and frequency is to be connected to the primary winding 62. The secondary winding 70 furnishes gating voltages for one or more of the magnetic amplifiers as illustrated in FIG. 2. Since the secondary winding 70 is connected through a center tap 71 to ground, it is able to provide gating voltages of both the $\theta$ and the $\phi$ phases.

The secondary winding 80 is provided with end leads or taps 81 and 86 and intermediate taps 82, 83, 84, and 85. The end tap 81 is connected through a series reactor 90 and a resistor 92 to the tap 83. The end tap 86 is connected through a series reactor 91 and a resistor 93 to the tap 84. The taps 82 and 85 are connected through rectifiers 101 and 102, respectively, to ground. The junction of the reactor 90 and the resistor 92 furnishes a bias voltage for non-linear circuits of the $\phi$ phase and reset voltage of the $\theta$ phase. The junction of the reactor 91 and resistor 93 furnishes bias voltage of a $\theta$ phase for the non-linear circuits and reset voltage of the $\phi$ phase.

For certain applications, it is desirable for magnetic amplifiers, as shown in FIGURE 2, to be cascaded. Theoretically, if perfectly square hysteresis loop magnetic core material having negligible coercive force and zero reverse leakage rectifiers are used in magnetic amplifier systems incorporating voltage reset means, the output for saturable reactors in the magnetic amplifier systems is a function of the amount of reset applied to the saturable reactors by the reset circuit or windings. A signal applied to the input of such cascaded magnetic amplifier system tends to block the reset voltage of the first stage at the reset rectifier, if the magnitude of the input signal, at any particular time, is larger than that of the reset voltage. Therefore, the reset is removed from a saturable reactor or magnetic amplifier of the first stage and on the following half-cycle the gating supply voltage will produce a full output. By proper design, the output from the first stage of a cascaded magnetic amplifier system can be made large enough in magnitude to block the reset voltage of the second stage. By so doing, there is a full output subject to the conditions above from the second stage in the same manner as from the first stage. This is followed through N stages of the cascaded magnetic amplifier system.

In practice, perfectly square hysteresis loop magnetic core material can be approached but never achieved with the present core fabrication, methods and processes. The residual flux density of the magnetic core material is always less than the maximum flux density. Thus, the saturable reactor of the first stage is not completely saturated for the entire gating half-cycle. Rectifiers with zero reverse leakage are also not available. This reverse leakage of the rectifiers further modifies the stage of flux in the magnetic core during the reset half-cycle. As a result, a signal applied to the input of a cascaded magnetic amplifier system will produce at the output of the first stage, a conduction angle that is less than the conduction angle of the input signal. The "conduction" angle referred to herein is defined as that portion of a half-cycle during which a saturable reactor is saturated and allows conduction to the reset of the circuit.

An additional attenuation in conduction angle is added by each stage, so that after a sufficient number of N stages, an output might not appear at all.

Conduction angle attenuation requires that the manufacturing of cascading magnetic amplifier systems be based upon holding the characteristics of magnetic core materials and rectifiers to an optimum quality obtainable, in order to produce a usable system, even with such quality control some circuits, such as ringing circuits and holding circuits in logic design, are still troublesome because of the successive stage attenuation of the output conduction angle.

Figure 4:
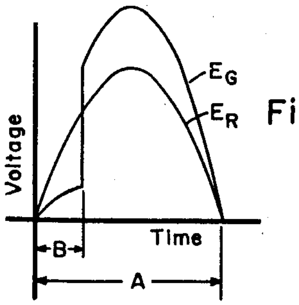
FIG. 4 is a graphical representation of waveforms present in the apparatus of FIG. 3.
Figure 5:
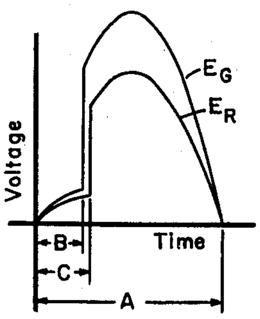
FIG. 5 is a graphical representation of waveforms present in the apparatus of FIG. 3.

An examination of the waveforms present in the apparatus of FIGURE 3 will clarify the operation of the power supply 60. Assuming a sinusoidal alternating-current voltage is applied to the terminal 41 in FIGURE 3, the reset voltage $E_r$ would be as illustrated in FIGURE 4. Assuming that the input voltage applied at the terminals 10 of FIGURE 3, is actually an output from a preceding magnetic amplifier stage, the input $E_g$ would appear as illustrated in FIGURE 4, because of the characteristics of the magnetic core materials and rectifiers as hereinbefore explained. Thus, with an input voltage $E_g$ conduction angle of (A—B) and a reset voltage $E_r$ conduction angle of (A), where A=180°, it is apparent that the input voltage $E_g$ at the terminal 10 will not block the reset voltage $E_r$ over the full half-cycle. As a result, the magnetic amplifier 30 will be reset to some degree and on the gating half cycle, an additional attenuation of the output conduction angle at the terminal 50 will appear. By placing series reactors 90 and 91 in series with the voltage being supplied from the secondary winding 80 of the power supply 60, the reset voltage $E_r$ can be made to appear as illustrated in FIGURE 5, with the input voltage $E_g$ at the terminal 10 being assumed to stay the same. That is, the series reactors 90 and 91 will absorb some predetermined portion of the reset voltages to be supplied to the magnetic amplifier circuits. The conduction angle (A—C) has been designed to be equal to or smaller than the conduction angle (A—B) of any voltage presented to the input terminal 10 of the magnetic amplifier 30. Therefore, the reset voltage $E_r$ of every stage can be blocked over the full half cycle to reset operation and the output of that stage will be a function of its components and magnetic properties without additional attenuation in conduction angle. The resistors 92 and 93 provide return paths for the exciting currents of the series reactors 90 and 91 before their respective saturations. During the predetermined interval that the reactor 90 is saturating, the reactor 91 is resetting.

When terminal 82 becomes positive with respect to the terminal 85, the rectifier 101 connects the terminal 82 to ground, therefore, providing the terminal 41 with negative direct current of the $\theta$ phase for the purpose of biasing the non-linear circuit 40. If the terminal 85 becomes positive with respect to the terminal 82, the rectifier 102 connects the terminal 85 to ground and the terminal 21 is furnished with negative direct current of the $\phi$ phase to bias the non-linear circuit 20.

It is presumed in the preceding paragraph that the rectifiers 101, 102 would truly connect the taps 82, 85 to ground. However, because rectifiers 101, 102 may have forward drops amounting to a substantial portion of the reset voltages developed between taps 81, 82 or 85, 86 some compensating means is introduced by connection of resistors 92 and 93 to taps 83 and 84, respectively. This additional voltage, so developed, opposes the forward drops of the rectifiers 101, 102 providing connections which are effectively at ground potential.

Figure 6:
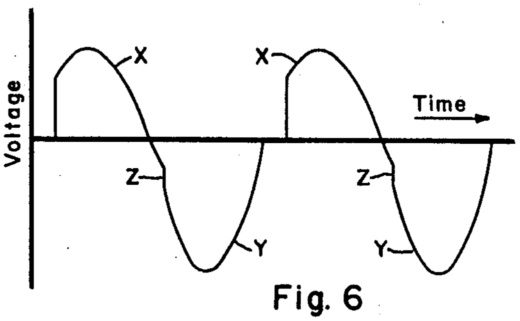
FIG. 6 is a graphical representation of waveforms present in the apparatus of FIG. 3.

Thus in combination, the reactors 90, 91 and the rectifiers 101, 102 co-operate with the secondary winding 80 to furnish a combined waveform as illustrated in FIGURE 6. Only one phase of the waveforms provided is illustrated in FIGURE 6. The X portions of the curve of FIGURE 6 supply the resetting for the magnetic amplifier 30 and the Y portions of the curve furnish the negative direct current bias supply for the non-linear circuit of one phase. The Z portions of the Y curves show a slight discontinuity because of the resetting of the series reactors during that time. However, this does not affect the operation of the amplifier. Therefore, the power supply provides both non-linear element bias and reset voltage from a single conductor instead of two conductors as usually required. This provides a saving in the cost of wiring. When combined with the configuration of the magnetic amplifier as illustrated in FIGURE 2, the power supply 60 provides very simple connections for a multi-magnetic amplifier system.

In conclusion, it is to be pointed out that while the illustrated example constitutes practical embodiments of my invention, I do not limit myself to the exact details shown, since modification of the same may be varied without departing from the spirit and scope of this invention.

I claim as my invention:

1. A magnetic amplifier comprising; a saturable magnetic core having inductively disposed thereon a winding; a non-linear circuit including an output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said input means opposing application of said reset pulsating direct current voltage to said winding.

2. A magnetic amplifier comprising; a saturable magnetic core having inductively disposed thereon a winding; a non-linear circuit including an output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said input means opposing application of said reset pulsating direct current voltage to said winding; and power supply means for said magnetic amplifier providing said gating, reset and bias voltages.

3. A magnetic amplifier comprising; a saturable magnetic core having inductively disposed thereon a winding; a non-linear circuit including an output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said input means opposing application of said reset pulsating direct current voltage to said winding; said reset self-saturating rectifier being connected in parallel with said current limiting means.

4. A magnetic amplifier comprising; a saturable magnetic core having inductively disposed thereon a winding; a non-linear circuit including a output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said input means opposing application of said reset pulsating direct current voltage to said winding; said reset self-saturating rectifier being connected in parallel with said current limiting means; and power supply means for said magnetic amplifier providing said gating, reset and bias voltages.

5. A magnetic amplifier comprising; a saturable magnetic core having inductively disposed thereon a winding; a non-linear circuit including an output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said reset self-saturating rectifier being connected in parallel with said current limiting means; and power supply means for said magnetic amplifier providing said gating, reset and bias voltages, said power supply means comprising a transformer including a secondary winding having end leads and a pair of intermediate leads; means connected to each said end lead for providing a pulsating reset voltage having a predetermined conduction angle; each said intermediate tap being connected through a rectifier to provide a negative pulsating bias voltage; said power supply being operative to allow connection of one said end leads of said secondary to said paralleled reset self-saturating rectifier and current limiting means to furnish said magnetic amplifier with said reset and said bias voltages on one conductor and predetermned current return paths.

6. A magnetic amplifier comprising; a saturable magnetic core having inductively disposed thereon a winding; a first non-linear circuit including an output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said input means including a second non-linear circuit; said reset self-saturating rectifier being connected in parallel with said current limiting means; and power supply means for said magnetic amplifier providing said gating, reset and bias voltages; said power supply means comprising a transformer including a secondary winding having a first end lead and a second end lead and a pair of intermediate leads; first saturable means connecting said first end lead to said second non-linear circuit to furnish bias voltage therefor; second saturable means connecting said second end lead to said paralleled reset self-saturating rectifier and current limiting means to furnish said reset and bias voltages thereto.

7. A magnetic amplifier comprising; a saturable magnetic core having inductively disposed thereon a winding; a non-linear circuit including an output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said reset self-saturating rectifier being connected in parallel with said current limiting means; and power supply means for said magnetic amplifier providing said gating, reset and bias voltages, said power supply means comprising a transformer including a secondary winding having a first end lead and a second end lead and a first pair of intermediate taps; each said end lead being connected through a series reactor to provide a pulsating reset voltage; each said intermediate tap being connected through a rectifier to provide a negative pulsating bias voltage; said power supply being operative to allow connection of one said end leads of said secondary to said parallel reset self-saturating rectifier and current limiting means to furnish said magnetic amplifier with said reset and said bias voltages on one conductor and predetermined current return paths.

8. A magnetic amplifier comprising; a saturable magnetic core having inductively disposed thereon a winding; a non-linear circuit including an output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said reset self-saturating rectifier being connected in parallel with said current limiting means; and power supply means for said magnetic amplifier providing said gating, reset and bias voltages, said power supply means comprising a transformer including a secondary winding having a first end lead and a second end lead and a first pair and a second pair of intermediate taps; each said end lead being connected through a series reactor to provide a pulsating reset voltage; each tap of said first pair being connected through an associated rectifier to provide a negative pulsating bias voltage; each said end lead, said associated series reactor, and a resistance means being serially connected to a respective one of said second pair of taps on said secondary winding to provide return paths for exciting current for said series reactors.

9. A magnetic amplifier comprising; a saturable magnetic core having inductively disposed thereon a winding; a non-linear circuit including an output non-linear circuit rectifier, a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said reset self-saturating rectifier being connected in parallel with said current limiting means; and power supply means for said magnetic amplifier providing said gating, reset and bias voltages, said power supply means comprising a transformer including a secondary winding having a first end lead and a second end lead and a first pair and a second pair of intermediate taps; each said end lead being connected through a series reactor to provide a pulsating reset voltage; each tap of said first pair being connected through an associated rectifier to provide a negative pulsating bias voltage; each said end lead, said associated series reactor, and a resistance means being serially connected to a respective one of said second pair of taps on said secondary winding to provide return paths for exciting current for said series reactors, said second pair of taps being disposed within said first pair of taps with respect to said end leads.

10. A magnetic amplifier comprising; a saturable magnetic core having inductively disposed thereon a winding; a non-linear circuit including an output non-linear circuit rectifier; a negative pulsating direct-current bias voltage and a current limiting means connected in series circuit relationship; a gating circuit connected across said output non-linear circuit rectifier and including a gating alternating voltage, a gating self-saturating rectifier and said winding connected in series circuit relationship; a reset circuit connected across a portion of said winding and including a reset pulsating direct-current voltage, a reset self-saturating rectifier and an input means for said magnetic amplifier connected in series circuit relationship; said reset self-saturating rectifier being connected in parallel with said current limiting means; and power supply means for said magnetic amplifier providing said gating, reset and bias voltages, said power supply means comprising a transformer including a secondary winding having a first portion and a second portion; said first portion having a first end lead and a second end lead and a first pair and a second pair of intermediate taps; each said end lead being connected through a series reactor to provide a pulsating reset voltage; each tap of said first pair being connected through an associated rectifier to provide a negative pulsating bias voltage; said power supply being operative to allow connection of one said end leads of said first portion to said paralleled reset self-saturating rectifier and current limiting means to furnish said magnetic amplifier with said reset and said bias voltages on one conductor and predetermined current return paths, said second pair of taps being disposed within said first pair of taps with respect to said end leads; said second portion having a pair of end leads and an intermediate tap to provide said gating alternating voltage between one said end lead of the second portion and said intermediate tap.

11. A magnetic amplifier comprising; a saturable magnetic core having inductively disposed thereon a winding; a gating circuit for said magnetic amplifier comprising means for connecting a gating alternating voltage through a first rectifier to said winding; a reset circuit for said magnetic amplifier comprising means for connecting a reset alternating voltage through a second rectifier to said winding; said gating and reset voltages being of the same frequency and phased substantially 180° apart; said gating and reset circuits having a common current path through at least a portion of said winding; means for applying an input signal to said reset circuit to block the application of said reset voltage to said winding; and output terminal means responsive to the energization of said gating circuit only.

12. A magnetic amplifier comprising; a saturable magnetic core having inductively disposed thereon a winding; a gating circuit for said magnetic amplifier comprising means for connecting a gating alternating voltage through a first rectifier to said winding; a reset circuit for said magnetic amplifier comprising means for connecting a reset alternating voltage through a second rectifier to said winding; said gating and reset voltages being of the same frequency and phased substantially 180° apart; said gating and reset circuits having a common current path through only a portion of said winding; means for applying an input signal to said reset circuit, whereby a predetermined portion of said reset voltage is blocked from application to said winding; and output terminal means responsive to the energization of said gating circuit only.

13. A magnetic amplifier comprising; a saturable magnetic core having inductively disposed thereon a winding; a gating circuit for said magnetic amplifier comprising means for connecting a gating alternating voltage through a first rectifier to said winding; a reset circuit for said magnetic amplifier comprising means for connecting a reset alternating voltage through a second rectifier to said winding; said gating and reset voltages being of the same frequency and phase substantially 180° apart; said gating and reset circuits having a common current path through only a portion of said winding; said gating alternating voltage being operative to drive said core toward positive saturation; said reset alternating voltage being operative to drive said core away from said positive saturation; means for applying an input signal to said reset circuit, whereby a predetermined portion of said reset voltage is blocked from application to said winding; and output terminal means responsive to the energization of said gating circuit only.

14. A magnetic amplifier comprising; a saturable magnetic core having inductively disposed thereon a winding; a gating circuit for said magnetic amplifier comprising means for connecting a gating alternating voltage through a first rectifier to said winding; a reset circuit for said magnetic amplifier comprising means for connecting a reset alternating voltage through a second rectifier to said winding; said gating and reset voltages being of the same frequency and phase substantially 180° apart; said gating and reset circuits having a common current path through at least a portion of said winding; means for applying an input signal to said reset circuit to block the application of said reset voltage to said winding; output terminal means responsive to the energization of said gating circuit only; and power supply means for supplying said gating and reset alternating voltages.

15. A magnetic amplifier comprising; a saturable magnetic core having inductively disposed thereon a winding; a gating circuit for said magnetic amplifier comprising means for connecting a gating alternating voltage through a first rectifier to said winding; a reset circuit for said magnetic amplifier comprising means for connecting a reset alternating voltage through a second rectifier to said winding; said gating and reset voltages being of the same frequency and phased substantially 180° apart; said gating and reset circuits having a common current path through only a portion of said winding; means for applying an input signal to said reset circuit, whereby a predetermined portion of said reset voltage is blocked from application to said winding; and output terminal means responsive to the energization of said gating circuit only; and power supply means for supplying said gating and reset alternating voltages.

16. A magnetic amplifier comprising; a saturable magnetic core having inductively disposed thereon a winding; a gating circuit for said magnetic amplifier comprising means for connecting a gating alternating voltage through a first rectifier to said winding; a reset circuit for said magnetic amplifier comprising means for connecting a reset alternating voltage through a second rectifier to said winding; said gating and reset voltages being of the same frequency and phased substantially 180° apart; said gating and reset circuits having a common current path through only a portion of said winding; said gating alternating voltage being operative to drive said core toward positive saturation; said reset alternating voltage being operative to drive said core away from said positive saturation; means for applying an input signal to said reset circuit, whereby a predetermined portion of said reset voltage is blocked from application to said winding; and output terminal means resonsive to the energization of said gating circuit only; and power supply means for supplying said gating and reset alternating voltages.

17. A magnetic amplifier comprising a saturable magnetic core having inductively disposed thereon a winding having first, second and tap leads; said winding having an alternating gating voltage of a first phase connected through a first rectifier to said first lead of said winding; said winding having an alternating reset voltage of a second phase connected through a second rectifier to said second lead in said winding; said alternating voltages being of the same frequency and phase substantially 180° apart; means connecting said tap lead of said winding to an input means; means connecting said second lead of said winding to an output means; the currents from said reset and gating voltages having a common path through only a portion of said winding; and means for applying an input signal to said input means; said input signal being operative to oppose application of said reset voltage to said winding.

References Cited in the file of this patent

UNITED STATES PATENTS

| | | |
|---|---|---|
| 2,740,086 | Evans et al. | Mar. 27, 1956 |
| 2,760,088 | Pittman et al. | Aug. 21, 1956 |
| 2,773,133 | Dunnet | Dec. 4, 1956 |
| 2,773,235 | Malick | Dec. 4, 1956 |
| 2,783,315 | Ramey | Feb. 26, 1957 |
| 2,809,343 | Pittman | Oct. 8, 1957 |
| 2,826,731 | Paynter | Mar. 11, 1958 |
| 2,892,975 | Eilers | June 30, 1959 |
| 2,910,643 | Patton | Oct. 27, 1959 |